United States Patent
Yu et al.

(10) Patent No.: US 10,760,367 B2
(45) Date of Patent: Sep. 1, 2020

(54) WELLHEAD SEALING DEVICE OF SUCKER-ROD PUMPING MACHINE

(71) Applicants: Licheng Yu, Heilongjiang (CN); Kao Si, Heilongjiang (CN)

(72) Inventors: Licheng Yu, Heilongjiang (CN); Kao Si, Heilongjiang (CN)

( * ) Notice: Subject to any disclaimer, the term of this patent is extended or adjusted under 35 U.S.C. 154(b) by 0 days.

(21) Appl. No.: 16/068,594

(22) PCT Filed: Jan. 29, 2016

(86) PCT No.: PCT/CN2016/072838
§ 371 (c)(1),
(2) Date: Jul. 6, 2018

(87) PCT Pub. No.: WO2017/117837
PCT Pub. Date: Jul. 13, 2017

(65) Prior Publication Data
US 2019/0017342 A1    Jan. 17, 2019

(30) Foreign Application Priority Data

Jan. 8, 2016   (CN) .......................... 2016 1 0013004

(51) Int. Cl.
*E21B 33/03*    (2006.01)
*E21B 33/06*    (2006.01)
(Continued)

(52) U.S. Cl.
CPC .............. *E21B 33/06* (2013.01); *E21B 33/03* (2013.01); *E21B 43/126* (2013.01); *F16N 15/00* (2013.01); *F16N 11/04* (2013.01)

(58) Field of Classification Search
CPC ........ E21B 33/03; E21B 33/06; E21B 43/126; F16N 15/00
See application file for complete search history.

(56) References Cited

U.S. PATENT DOCUMENTS

| | | | |
|---|---|---|---|
| 3,887,196 A  *  | 6/1975 | Renfrow | ................. E21B 33/08 |
| | | | 277/318 |
| 3,939,910 A  *  | 2/1976 | Bruce | ..................... E21B 33/06 |
| | | | 166/84.2 |

(Continued)

FOREIGN PATENT DOCUMENTS

| CN | 200985764 Y | 12/2007 |
|---|---|---|
| CN | 201024953 Y | 2/2008 |

(Continued)

*Primary Examiner* — Matthew R Buck
(74) *Attorney, Agent, or Firm* — Novick, Kim & Lee, PLLC; Allen Xue (57) ABSTRACT

Provided is a wellhead sealing device of a sucker-rod pumping machine, including a flexible connection unit, and further including a blowout prevention unit, a closing unit, a declination rectification unit and a lubrication unit, wherein the flexible connection unit is arranged between a wellhead and a packing box, and includes a lower flexible sealing sleeve (37), a lower flexible sealing sleeve housing (12), a sealing steel ring (11) and an upper flexible sealing sleeve (10). Portions above the flexible connection unit follow integrally a polished rod (7) constantly to swing, such that a packing (9) is dynamically coaxial with the polished rod (7) and the problem of eccentric wear of the packing can be completely solved. Furthermore, the device can also solve the problems of static coaxiality and lubrication between the polished rod (7) and the packing (9), as well as the problem of blowout prevention when the polished rod (7) is broken off.

21 Claims, 5 Drawing Sheets

(51) Int. Cl.
*E21B 43/12* (2006.01)
*F16N 15/00* (2006.01)
*F16N 11/04* (2006.01)

(56) References Cited

U.S. PATENT DOCUMENTS

| | | | | |
|---|---|---|---|---|
| 4,907,650 | A * | 3/1990 | Heinonen | E21B 33/08 166/80.1 |
| 6,412,783 | B1 * | 7/2002 | Finnestad | E21B 33/08 166/84.1 |
| 6,637,509 | B2 * | 10/2003 | Farquharson | E21B 33/08 166/241.2 |
| 7,284,602 | B2 * | 10/2007 | Tessier | E21B 33/08 166/80.1 |

FOREIGN PATENT DOCUMENTS

| | | |
|---|---|---|
| CN | 101205801 A | 6/2008 |
| CN | 101608537 A | 12/2009 |
| CN | 201778723 U | 3/2011 |
| CN | 103628838 A | 3/2014 |
| CN | 204040980 A | 12/2014 |
| CN | 204175227 A | 2/2015 |
| CN | 204532224 U | 8/2015 |
| CN | 205349277 U | 6/2016 |

* cited by examiner

WELLHEAD SEALING DEVICE OF SUCKER-ROD PUMPING MACHINE

TECHNICAL FIELD

The present invention relates to a wellhead sealing device of a sucker-rod pumping machine, and particularly to a flexible connection unit of a wellhead sealing device of a sucker-sucker-rod pumping machine.

BACKGROUND

Most of international oilfields employ sucker-rod pumping equipment. A sucker rod drives a sucker pump to reciprocate up and down in a tubing, so as to lift oil to the ground, and transport it to a superior-level system through a pipeline. A wellhead sealing device is mounted above a wellhead oil pipeline. In general, the wellhead sealing device includes a blowout prevention unit, a closing unit, a declination rectification unit and a packing box, and a core part of its operation is the packing box, and a wellhead of the sucker-rod pumping machine in an operating state is sealed by compacting a packing in the packing box. A function of the wellhead sealing device is to ensure that the wellhead is sealed when the sucker-rod pumping machine is in an operating state, a packing replacing state and a rod breaking state.

A sealing mechanism of the wellhead sealing device of the sucker-rod pumping machine is that the packing is filled in an annular space formed by a polished rod and the packing box; and a gland extrudes the packing downwards to deform it, so as to increase pressure intensities among the polished rod and the inner wall of the packing box and the packing, so that the purpose of sealing the wellhead is achieved.

The wellhead sealing device of the sucker-rod pumping machine mainly includes the following units:

a blowout prevention unit, which does not affect the normal operation of the sucker-rod pumping machine daily, and when the polished rod of the sucker-rod pumping machine is broken off, an action component of the blowout prevention unit will rapidly automatically plug the wellhead under an impact of a liquid;

a closing unit, which does not affect the normal operation of the sucker-rod pumping machine daily, and when the sucker-rod pumping machine is shut down and the packing in the packing box is replaced, the closing unit is manually operated, so that the packing in the packing box is extruded to deform and close the wellhead;

a declination rectification unit, which is operated under a closing state, so that the packing and the polished rod are statically coaxial to achieve declination rectification of the packing box;

and a packing box, which is used for placing a plurality of packings therein and deforms by extruding the packing downwards, so as to seal the wellhead when the sucker-rod pumping machine is in the operating state. In an ideal state, the packing box must be kept coaxial with the polished rod (here the packing box or a packing group is kept in parallel and concentrical with the polished rod constantly, which is called dynamic coaxial), and meanwhile, sufficient lubrication between the packing and the polished rod is ensured, and eccentric wear and dry grinding of the packing are avoided.

In the production practice, because the depth of an oil well scales from a few kilometers to several kilometers, and the wellhead of the oil well is not likely to maintain dynamic coaxial with the polished rod. There are two reasons for this: first, static errors, that is, errors produced by non-coaxiality of the wellhead and the polished rod when the sucker-rod pumping machine is shut down, these errors include engineering errors brought about by underground and ground constructions, as well as cumulative errors due to geological changes, climate changes, and environmental changes over a period of time; and second, dynamic errors, that is, errors produced by non-coaxiality of the wellhead and the polished rod when the sucker-rod pumping machine is in the operating state, these errors include errors caused by jittering, bending, and the like of the polished rod when the sucker-rod pumping machine is in the operating state, and errors due to geological changes, climate changes, and environmental changes.

Since a position of the polished rod in the closing unit is changed in two states of ON and OFF, operating an existing declination rectification unit cannot realize static coaxiality between the packing and the polished rod, and the existing wellhead sealing device does not have a dynamic declination rectification function, thereby causing a result that the packing is always in an eccentric wear state due to dynamic non-coaxiality with the polished rod when the existing sucker-rod pumping machine operates (non-uniform wear of the packing by the polished rod is called eccentric wear).

The Chinese utility model patent with a publication number CN201024953Y discloses a multifunctional automatic declination-adjusting polished rod sealer, including a sealing device and an automatic declination-adjusting device, wherein the sealing device consists of a packing, a compression ring, a packing pressure cap and a handle; and the automatic declination-adjusting device consists of an adjusting ball, an adjusting pressure cap, a centralizing sleeve, an "O-shaped" ring and a main body. The utility model is improved on an original sealer and the adjusting ball is integrated with the adjusting pressure cap, the centralizing sleeve and the "O-shaped" ring into a whole in the automatic declination-adjusting device; an inner surface of the upper part of the main body is designed as a spherical shape, an inner surface of the middle part is designed as a conical shape, and an inner surface of the lower part is designed as a cylindrical shape. A combining part of the upper part and the middle part of the main body and a combining part of the middle part and the lower part of the main body are in dynamic matching with the polished rod, a sealing floating ball is mounted in the middle part of the conical shape; and a closing rubber valve is mounted at the lower part of the main body. The improved sealer may solve the problems of uneven wear of a sealing ring and loss of crude oil due to declination of an axis of the polished rod and an axis of a sealing main body, and may automatically adjust a declination; and when the polished rod is broken off, a well is automatically closed and the packing is conveniently replaced.

When the closing unit is in a closing state, it is necessary to ensure that the packing box and the polished rod are coaxial to facilitate the replacement of the packing and reduce the damage to the packing, the polished rod and an operator. However, a rubber valve type closing unit disclosed in the above patent and an existing rotary closing unit cannot be realized. When the sucker-rod pumping machine is shut down, adjusting the declination rectification unit must ensure that the packing box is coaxial with the polished rod. However, an existing flange ball type declination rectification unit and an existing eccentric ball type declination rectification unit are difficultly adjusted to an ideal state due to interference from the closing unit during on-site operation.

The Chinese utility model patent with a publication number of CN200985764Y discloses a wellhead blowout prevention device of a sucker-rod pumping machine, which consists of an oil cap, a dustproof ring, a pressure cap, a centralizing wheel train, a coupling sleeve, a spring, a conical spiral packing, a sealing ball head and a lower joint from the top down, wherein the centralizing wheel train is composed of upper and lower centralizing wheel trains, the upper centralizing wheel train is compacted at the upper part of the coupling sleeve by the oil cap, the dustproof ring and the pressure cap, and the lower centralizing wheel train is located at the bottom of the sealing ball head, the coupling sleeve is in threaded coupling with the sealing ball head, a ball head pressure cap is sleeved at the upper part of the ball head and in threaded coupling with the lower joint, the conical spiral packing is composed of upper and lower conical spiral packing groups, the upper conical spiral packing group is located within a conical body of the coupling sleeve, the lower spiral packing group is located at the upper part of a lower spiral packing base of an inner cavity of the sealing ball head, and the upper spiral packing group and the lower spiral packing group are compacted by an upper spring sleeve and a lower spring sleeve through the spring.

Because the sucker-rod pumping machine operates normally, a sealing ball and a baffle in the sealing ball type blowout prevention structure employed in this patent and an existing blowout prevention structure such as a baffle type blowout prevention structure are subject to different degrees of wear, when the polished rod is broken off, most of existing blowout prevention units do not play a role in blowout prevention.

Because the existing wellhead sealing devices have not completely solved the problems of eccentric wear and lubrication of the packing and the polished rod of the sucker-rod pumping machine, the existing wellhead sealing devices have the following defects: firstly, the service life of the packing and the polished rod is short, the difficulty in mounting or dismounting the packing is large; secondly, randomness in leakage and venting is high, the environment is polluted, workers are required to inspect wells every day and production and operation costs are high; and thirdly, the pressure and the friction force of the polished rod in most areas of the packing are too large, which results in excessive energy consumption in the pumping machine.

SUMMARY

The present invention aims to provide a wellhead sealing device of a sucker-rod pumping machine, which realizes dynamic coaxiality between a polished rod (7) and a packing (9) and thoroughly solves the problem of uneven wear of the packing (9) by the polished rod (7). The sealing device may further solve the problem of static coaxiality and lubrication between the polished rod (7) and the packing (9). Meanwhile, the present invention further solves the problem of blowout prevention when the polished rod (7) is broken off.

The wellhead sealing device of the sucker-rod pumping machine of the present invention includes a flexible connection unit, wherein the flexible connection unit is arranged between a wellhead and the packing box, and portions above the flexible connection unit follow integrally the polished rod (7) constantly to swing, so that the dynamic coaxiality between the packing (9) and the polished rod (7) is realized, and the problem of eccentric wear of the packing (9) is thoroughly solved.

Furthermore, the wellhead sealing device of the sucker-rod pumping machine of the present invention further includes a flexible connection unit, wherein the flexible connection unit includes a lower flexible sealing sleeve (37), a lower flexible sealing sleeve housing (12), a sealing steel ring (11)) and an upper flexible sealing sleeve (10).

Furthermore, the wellhead sealing device of the sucker-rod pumping machine of the present invention further includes a packing box, wherein the packing box includes a packing (9), a packing outer sleeve (8), a packing compression ring (5), an upper knuckle bearing (3), a lower knuckle bearing (4), a pressure bearing (2) and a packing box pressure cap (1).

Furthermore, the wellhead sealing device of the sucker-rod pumping machine of the present invention further includes a declination rectification unit and a closing unit, wherein the declination rectification unit includes a declination rectification base (25), a declination rectification base sealing gasket (42), a declination rectification sealing ring (23), a declination rectification sealing ring upper sealing gasket (45), a declination rectification sealing ring lower sealing gasket (46), a flexible connecting sleeve (22), a dual-hemispherical centralizer (20), a horizontal compression ring (21), a horizontal compression ring upper sealing gasket (41), a horizontal compression ring lower sealing gasket (43), a declination rectification pressure cap (44) and a declination rectification pressure cap pin (24), wherein the closing unit includes a closer base (18), a closing packing (19), a closing packing compression ring (15), a closing packing compression ring upper sealing gasket (38), a closing packing compression ring lower sealing gasket (40), a closing packing compression ring lifting pin (39), a semi-conical polished rod positioning block (16), a non-return oil collection ring (14), a closer pressure cap (13) and a closer pressure cap pin (17).

Furthermore, the wellhead sealing device of the sucker-rod pumping machine of the present invention further includes a lubrication unit, wherein a solid lubricator is installed between the packing (9) and the top of the wellhead sealing device to continuously and quantitatively provide a solid lubricant (35), wherein the solid lubricator includes a U-shaped connecting member (31), a waterproof sealing gasket (36), a solid lubricant housing (32), a solid lubricant (35), a pressure spring (34) and a plug (33), a non-return oil collection ring (14) is installed between the packing box and the wellhead to continuously provide oil as the liquid lubricant; wherein the non-return collection ring (14) is a ring-shaped elastic mesh body with a certain thickness, an inner diameter of which is equivalent to a diameter of the polished rod (7), and an oil-water mixture may smoothly enter an upper cavity through the mesh in a single direction, without easily flowing out of the cavity through the mesh.

Furthermore, the wellhead sealing device of the sucker-rod pumping machine of the present invention further includes a blowout prevention unit, wherein the blowout prevention unit includes a wellhead clamp joint (26), a wellhead clamp joint sealing gasket (47), a supporting spring (30), a lower supporting ring (29), an upper bracket (28), a blowout prevention ball (48), a blowout prevention ball balancing weight (49), a declination rectification base (25) and a declination rectification base pin (27).

The present invention realizes dynamic coaxiality between the polished rod (7) and the packing (9), fundamentally solves the problem of uneven wear of the packing (9) by the polished rod (7), realizes self-lubrication and continuous quantitative injection of the solid lubricant (35), and solves the problem of dry grinding between the packing (9) and the polished rod (7), thereby prolonging the service life of the polished rod (7) and the packing (9), and enabling four indicators of safety, environmental protection, energy saving and high efficiency to be far greater than before.

1. Safety and high efficiency: firstly, the service life of the polished rod (7) and the packing (9) is greatly prolonged, the service life of the packing (9) is prolonged by dozens of times, the replacement times of the packing (9) are reduced, that is, the packing (9) is replaced for a dozen times to dozens of times, for the sake of safety, the device of the present invention may be used to set the replacement cycle of the packing (9) to one year; and secondly, in a closing state, a packing (9) group is in a static coaxial with the polished rod (7), and it is easy to mount or dismount the packing (9); accordingly, an objective guarantee is provided for safe production while the labor intensity is reduced and the production efficiency is increased.

2. Energy saving and environmental protection: the present invention realizes the dynamic coaxiality between the polished rod (7) and the packing (9), and continuously and quantitatively injects the solid lubricant (35) while realizing self-lubrication, the above two aspects can guarantee that when the sucker-rod pumping machine operates normally, a friction force of the packing (9) to the polished rod (7) is extremely small, the energy consumption of the pumping machine is significantly reduced, and the energy saving effect is obvious. According to theoretical calculations of multiple scientific research institutions, the minimum energy saving is about 5%; the blowout prevention unit of the device of the present invention has a simple structure and reliable operation, and effectively plays a role of blowout prevention to protect the environment; and the device of the present invention eliminates random occurrence of leakage and venting of the wellhead, and has no pollution to the environment in processes such as installation, use, maintenance, and rod breakage.

BRIEF DESCRIPTION OF DRAWINGS

FIG. 2-1 is an upper flexible sealing sleeve of a flexible connection unit;

FIG. 2-2 is a lower flexible sealing sleeve of a flexible connection unit;

DETAILED DESCRIPTION

Embodiment 1

A declination rectification unit (achieving static coaxiality): in order to overcome the problem that an existing declination rectification technique is difficult to operate and determine, the present invention designs a declination rectification unit that cooperates with a closing unit.

Figure 4:
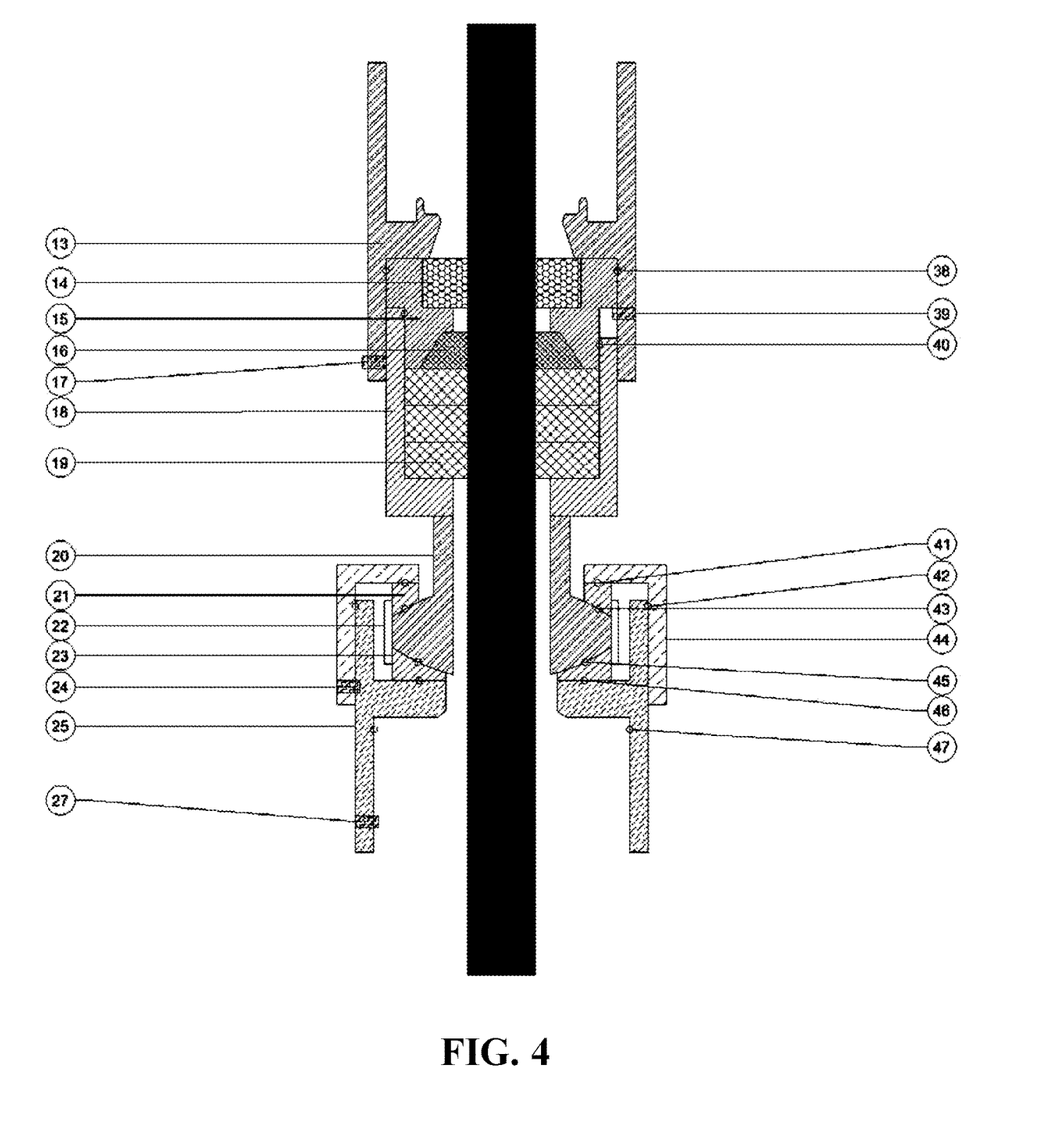
FIG. 4 is a front view of a closing unit and a declination rectification unit of a wellhead sealing device of a sucker-rod pumping machine.

Among them, the declination rectification unit is shown in FIG. 4. A declination rectification base (25) is in threaded connection with a wellhead clamp joint (26) of a blowout prevention unit, and sealed by a wellhead clamp joint sealing gasket (47), a horizontal compression ring (21) and a declination rectification pressure cap (44) are sleeved on a dual-hemispherical centralizer (20), the dual-hemispherical centralizer (20) is welded coaxially with a closer base (18), a declination rectification sealing ring upper sealing gasket (45) and a declination rectification sealing ring low sealing gasket (46) are embedded in a declination rectification sealing ring (23), a horizontal compression ring upper sealing gasket (41) and a horizontal compression ring lower sealing gasket (43) are embedded in a horizontal compression ring (21), the declination rectification sealing ring (23), the dual-hemispherical centralizer (20) and the horizontal compression ring (21) are freely placed on the declination rectification base (25) with a movable space from the bottom up, a flexible connecting sleeve (22) is sleeved on the horizontal compression ring (21) and the declination rectification sealing ring (23), the declination rectification pressure cap (44) is in threaded connection with the declination rectification base (25) and fixed by a declination rectification pressure cap pin (24), the declination rectification sealing ring (23), the dual-hemispherical centralizer (20) and the horizontal compression ring (21) are connected into a whole by the flexible connecting sleeve (22) to ensure overall movement of the declination rectification sealing ring (23) the dual-hemispherical centralizer (20) and the horizontal compression ring (21) without affecting the realization of a centralizing function.

Among them, a closing unit is shown in FIG. 4. A closing packing (19), semi-conical polished rod positioning blocks (16), a closing packing compression ring (15) with a closing packing compression upper sealing gasket (38) and a closing packing compression lower sealing gasket (40) and a non-return oil collection ring (14) are sequentially put into a closing unit base (18) from the bottom up, the two semi-conical polished rod positioning blocks (16) when they are combined are completely consistent with a lower cavity of the closing packing compression ring (15) in shape, a round hole is formed between the two semi-conical polished rod positioning blocks (16), an inner diameter of the round hole is equal to a diameter of the polished rod (7), a closer pressure cap (13) is in threaded connection with the closing unit base (18) and fixed by a closing pressure cap pin (17), the closer pressure cap (13) and the closing packing compression ring (15) are sealed through the closing packing compression upper sealing gasket (38) therebetween, the closing packing compression ring (15) and the closing unit base (18) are sealed through the closing packing compression lower sealing gasket (40) therebetween; during closing, the closing packing compression ring (15) moves downward, driving the two semi-conical polished rod positioning blocks (16) to automatically enter a conical space of the closing packing compression ring (15), and the polished rod (7) is forcibly centered and locked while in the well is closed, the problem that whether the existing declination rectification technology difficultly determines whether the two semi-conical polished rod positioning blocks (16) are in place is solved through this simple operation; during opening, the closing packing compression ring (15) is lifted by a closing packing compression ring lifting pin (39); the two semi-conical polished rod positioning blocks (16) leave naturally away from the conical space of the closing packing compression ring (15), and the semi-conical polished rod positioning blocks (16) freely move between the closing packing (19) and the closing packing compression ring (15), the two semi-conical polished rod positioning blocks (16) placed in the closing unit are free from wear during normal operation; and during closing, the polished rod (7) is forcibly centered and locked while the closing packing (19) is compacted.

The closing unit and the declination rectification unit cooperate to realize static declination rectification, with specific operation steps as follows: the closer pressure cap (13) is screwed, the closing packing compression ring (15) moves downwards to drive the two semi-conical polished rod positioning blocks (16) to automatically enter the conical space of the closing packing compression ring (15); the polished rod (7) is forcibly centered and locked while the well is closed, at this moment, the polished rod (7) has deviated from a natural position and then the declination rectification pressure cap (44) is properly unscrewed, a handbrake of the pumping machine is released to let the polished rod (7) drive the dual-hemispherical centralizer (20) to move upwards one time through the closing unit, and tightened to continue to properly unscrew the declination rectification pressure cap (44) to completely release constrains on the entire action component of the declination rectification unit, the polished rod (7) is shaken several times to drive the action component of the declination rectification unit to integrally move to a suitable position while bringing the polished rod (7) back to the natural position, so as to realize declination rectification, then the declination rectification pressure cap (44) is rapidly screwed, the declination rectification unit is locked while centralizing is realized, then a closer is opened, the polished rod is in a natural state, and changes in position, the static declination rectification unit is automatically accurately adjusted into position without human judgment, and static coaxiality of the packing and the polished rod is realized.

Embodiment 2

Figure 1:
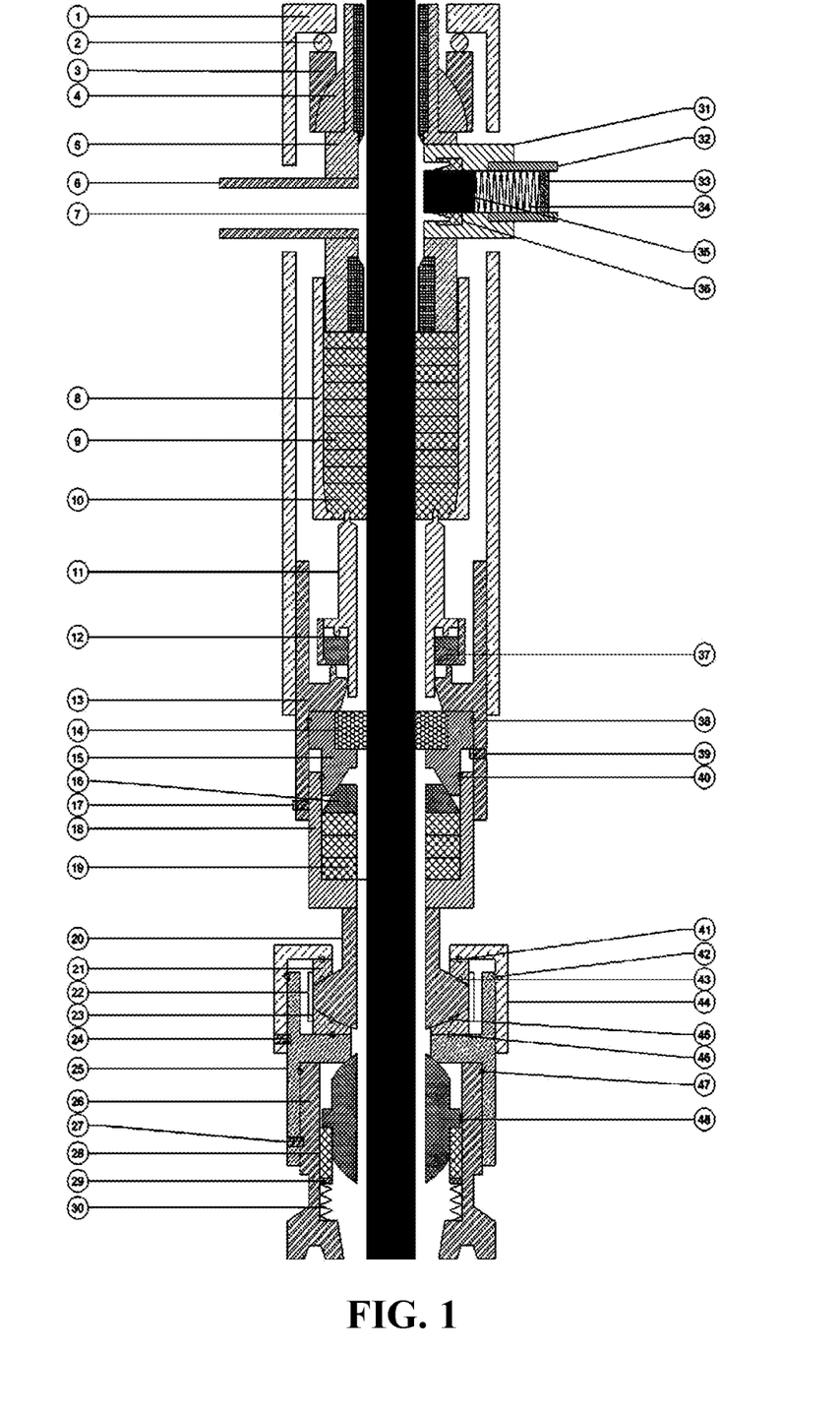
FIG. 1 is a front view of a wellhead sealing device of a sucker-rod pumping machine.
Figure 2:
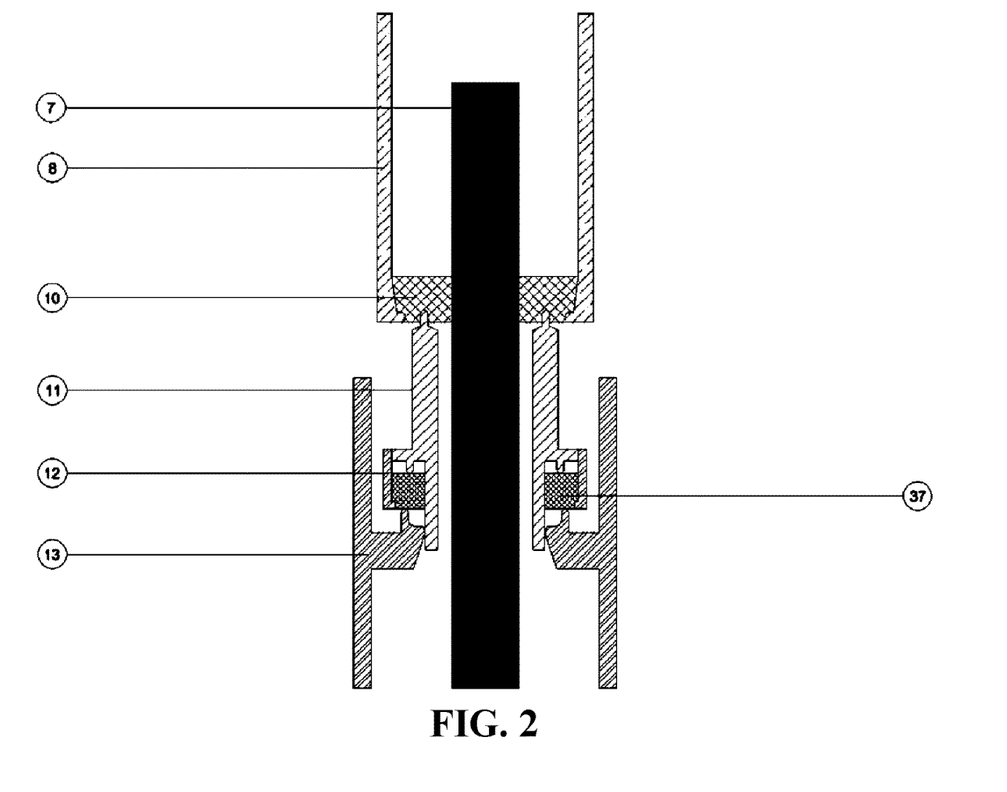
FIG. 2 is a front view of a flexible connection unit of a wellhead sealing device of a sucker-rod pumping machine.
Figure 3:
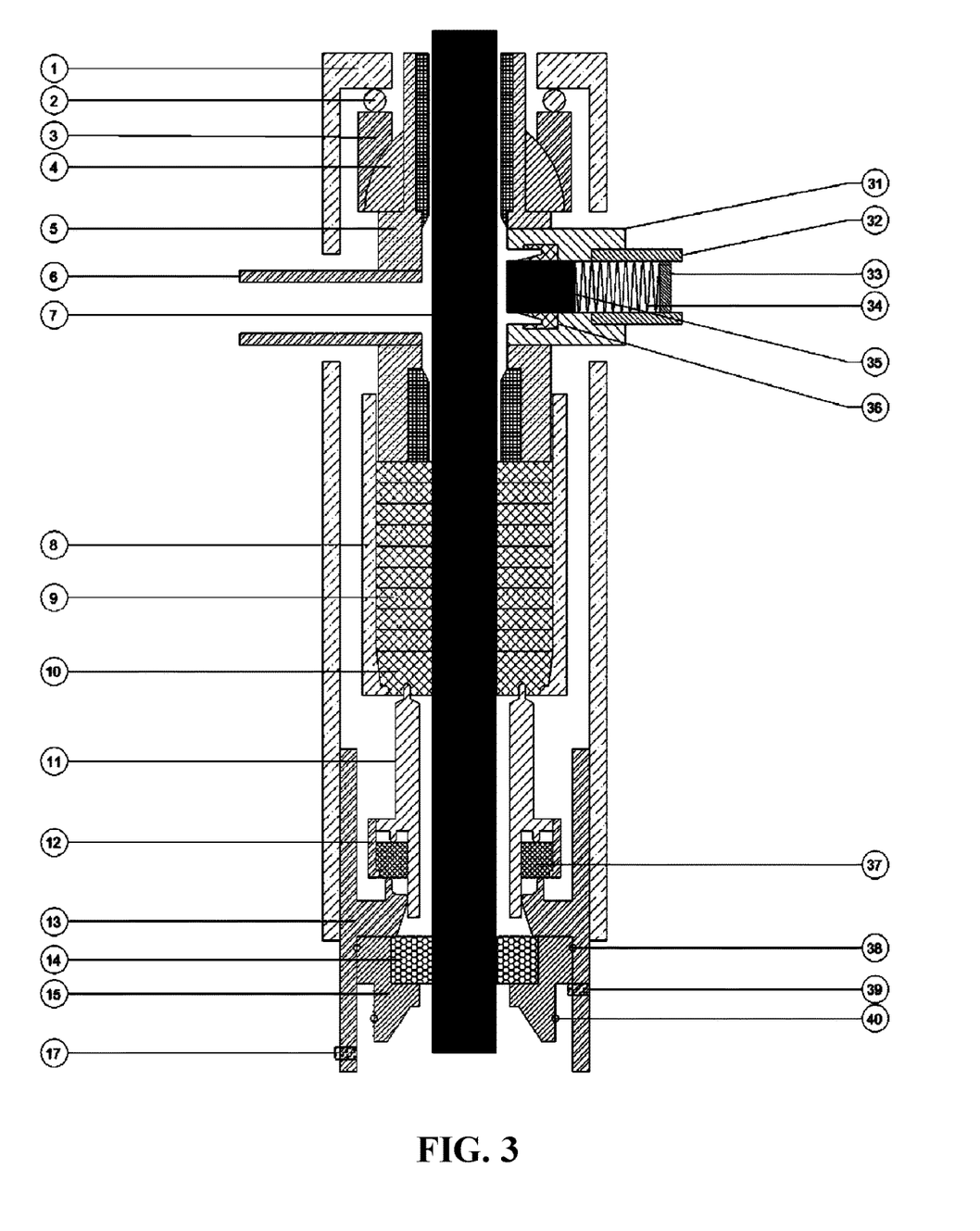
FIG. 3 is a front view of a wellhead sealing device, including a packing box, a flexible connection unit and a lubrication unit, of a sucker-rod pumping machine.

Since a sucker-rod pumping machine is in operation, a movement trajectory of a polished rod (7) must not be a straight line, but it is always accompanied by vibration and swing, that is, there is a transverse motion component, resulting in eccentric wear of a packing (9); a design of a wellhead sealing device of the prior art does not take objective requirements of dynamic declination rectification into account. The wellhead sealing device of the sucker-rod pumping machine of the present invention includes a flexible connection unit. As shown in FIG. 2, a lower flexible sealing sleeve (37) is placed into a lower flexible sealing sleeve housing (12), a sealing steel ring (11) is inserted downwards into the lower flexible sealing sleeve (37), an upper flexible sealing sleeve (10) is embedded into the bottom of a packing outer sleeve (8), and freely placed on the sealing steel ring (11), and the sealing steel ring (11) and a closer pressure cap (13) are both connected with the upper flexible sealing sleeve (10) and the lower flexible sealing sleeve (37) through a boss to meet sealing requirements. As shown in FIG. 3, there is enough space among the sealing steel ring (11), the lower flexible sealing sleeve housing (12) and a closer pressure cap (13) to meet movement requirements; when the sucker-rod pumping machine operates, the flexible connection unit is linked with the packing (9), the flexible connection unit swings integrally with the polished rod (7) under the drive of the packing (9); the flexible connection unit is arranged between the wellhead and a packing box, portions above the flexible connection unit follow integrally the polished rod (7) constantly to swing, so that dynamic coaxiality between the packing (9) and the polished rod (7) is realized, and the problem of eccentric wear of the packing (9) due to incapability of the packing to follow the polished rod to move since the packing box is rigidly connected with the wellhead in the prior art is thoroughly solved. The upper flexible sealing sleeve (10) is characterized by an inverted conical cylinder at the upper-half part, which facilitates the sealing with the packing outer sleeve (8); and characterized by a cylinder with a groove at the lower-half part, the upper flexible sealing sleeve (10) is clamped on the packing outer sleeve (8) by the groove; and the lower flexible sealing sleeve (37) is characterized by a reducing cylinder at the lower part, which facilitates the combination with the lower flexible sealing housing (12) and prevents the flexible sealing sleeve (37) from moving out of the lower flexible sealing sleeve housing (12) due to an excessive pressure, and the upper flexible sealing sleeve (10) and the lower flexible sealing sleeve (37) are made of a special organic material, which enable dynamic sealing.

The wellhead sealing device of the sucker-rod pumping machine of the present invention further includes a packing box and the like. As shown in FIG. 3, the packing (9) is placed in the packing outer sleeve (8), the packing compression ring (5) is inserted in the packing outer sleeve (8), a lower knuckle bearing (4), an upper knuckle bearing (3), a pressure bearing (2), and a packing box pressure cap (1) are sequentially sleeved on the packing compression ring (5), the packing box pressure cap (1) is in threaded connection with a closer pressure cap (13), and there is no contact between the packing outer sleeve (8) and the packing box pressure cap (1) and there is a lateral movement space therebetween; and when the sucker-rod pumping machine operates, the polished rod (7) drives the packing (9), the flexible connection unit, the lower knuckle bearing (4), the upper knuckle bearing (3) and the pressure bearing (2) to move freely, so that dynamic coaxiality between the packing (9) and the polished rod (7) is realized.

Embodiment 3

Figure 5:
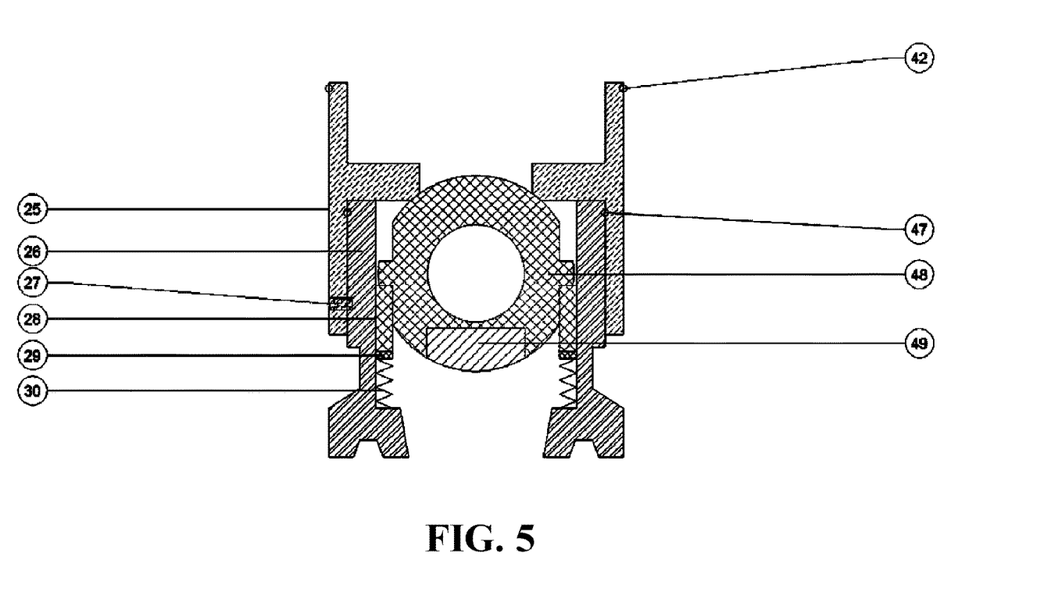
FIG. 5 is a front view of a blowout prevention state of a blowout prevention unit.

In order to overcome the defects of misoperation and non-operation of a blowout prevention unit of the prior art, the present invention fully adopts a principle of a spherical valve. As shown in FIG. 5, a supporting spring (30), a lower supporting ring (29) and an upper bracket (28) are sequentially freely placed into a cavity of a wellhead clamp joint (26) from the bottom up, a rotation shaft of a blowout prevention ball (48) is freely placed in a groove of the upper bracket, the wellhead clamp joint (26) is in threaded connection with a declination rectification base (25) and fixed by a declination rectification base pin (27), and the wellhead clamp joint (26) is sealed with the declination rectification base (25) by a wellhead clamp joint sealing gasket (47). The blowout prevention ball (48) is provided with a round hole with an appropriate size and with a diameter thereof as a central axis, the blowout prevention ball (48) is provided with a plugging hemisphere with a smaller specific gravity at one side, and a blowout prevention balancing weight (49) with a larger specific weight at the other opposite side; when the pumping machine normally operates, the polished rod (7) passes through the round hole, and the plugging hemisphere of the blowout prevention ball (48) is in a stock state without any wear, the inner wall of the lower edge of the hemisphere at one side of the blowout prevention ball balancing weight (49) is always in slight contact with the polished rod (7), the blowout prevention ball balancing weight (49) and the plugging hemisphere are in a horizontal state that are almost orthogonal to the polished rod, and a presence state of the polished rod (7) is determined, and a break-off signal of the polished rod (7) is acquired; and when the polished rod (7) of the pumping machine is broken off, the blowout prevention ball (48) is instantaneously rotated to push the plugging hemisphere to an upper pipeline under the action of the blowout prevention ball balancing weight (49), effective plugging may be effectively performed as long as a liquid has a pressure, and double risks of misoperation and non-operation of the blowout prevention unit are overcome.

Embodiment 4

Figure 6:
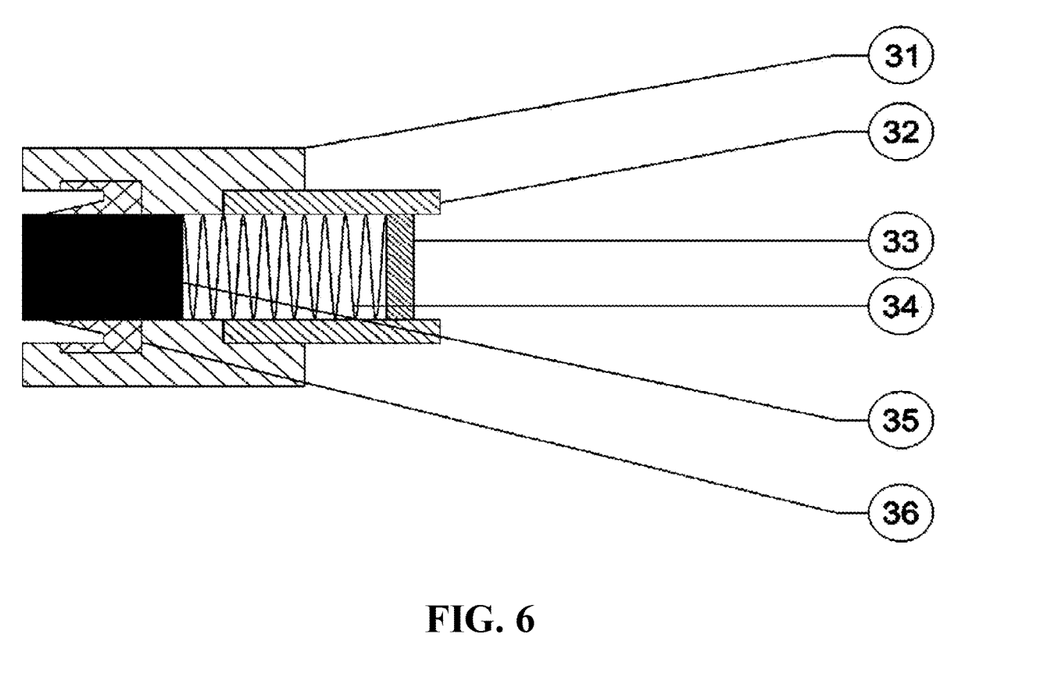
FIG. 6 is a front view of a lubricator.
Figure 21:
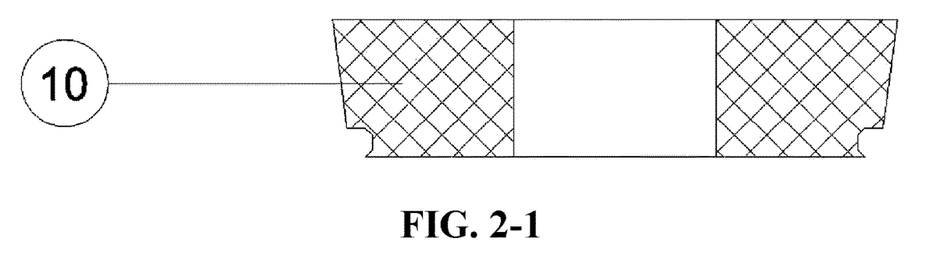
Figure 22:
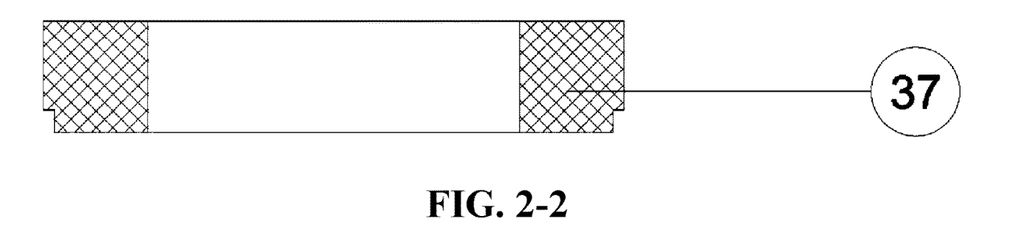

When a sucker-rod pumping machine operates, since a polished rod (7) penetrates through a packing box, both ends of the packing box are opened to the outside. In order to overcome the problems that a liquid lubricant cannot be stored in the packing box for a long period of time and quantitatively and constantly supplying the liquid lubricant can not be controlled in the prior art, the wellhead sealing device of the sucker-rod pumping machine of the present invention is provided with a lubrication unit for continuously and quantitatively providing the solid lubricant (35) and a liquid lubricant between the polished rod (7) and the packing (9). The lubrication unit includes a solid lubricator and a non-return oil collection ring (14). As shown in FIG. 3, a rain water diversion pipe (6) is in threaded connection with a packing compression ring (5), and a U-shaped connecting member (31) is inserted into a round hole of the packing compression ring (5) and fixed by a pin. As shown in FIG. 6, a waterproof sealing ring (36) is embedded in the U-shaped connecting member (31), and the U-shaped connecting member (31) is in threaded connection with a solid lubricant housing (32), the solid lubricant (35), the pressure spring (34) and a plug (33) are sequentially put into the solid lubricant housing (32), and the pressure spring (34) pushes the solid lubricant (35) to slightly press the polished rod (7); when the pumping machine operates, the polished rod (7) continuously adheres the solid lubricant (35), the solid lubricant (35) is continuously accumulated at a contact surface of the packing (9) and the polished rod (7), and the solid lubricant (35) is continuously and quantitatively provided between the packing (9) and the polished rod (7). As shown in FIG. 4, the non-return oil collection ring (14) is installed between the closer pressure cap (13) and the closing packing compression ring (15), the non-return oil collection ring (14) is an annular elastic mesh body with a certain thickness, with an inner diameter which is equivalent to a diameter of the polished rod (7), and its adsorption to crude oil is far superior to that of steel, rubber, and the like; when the pumping machine is in an upstroke, a pressurized oil-water mixture passes through the mesh and enters a cavity above the non-return oil collection ring (14); and when the pumping machine is in a downstroke, most of crude oil remains in the cavity, and a small portion of the crude oil flows out of the cavity together with the water. This process is continuously repeated and the crude oil is filled in the cavity, so that the problem of dry grinding of the packing (9) of a high water-cut sucker-rod pumping well and an intermittent pumping well is overcome.

Embodiment 5: Replacement of a Packing

In general, after a wellhead sealing device of a sucker-rod pumping machine is installed and operates for one year, a packing (9) should be replaced at regular intervals. When the packing is replaced, the pumping machine must be shut down firstly, a closer pressure cap (13) is screwed to close a well, a packing box pressure cap (1) is opened, a packing compression ring (5) and a component above it are fixed on a beam hanger, a packing outer sleeve (8) is lifted upwards with two hands by a suitable height, then the packing outer sleeve (8) is pulled back down into position, the packing (9) and an upper flexible sealing sleeve (10) are naturally exposed, an upper flexible sealing sleeve (10), a lower flexible sealing sleeve (37) and the packing (9) may be replaced without using any tool, and the packing box pressure cap (1) is screwed; static declination rectification must be performed when the packing is replaced every time, in order to eliminate static errors accumulated in the early period; the declination rectification pressure cap (44) is properly unscrewed, a handbrake of the pumping machine is released to let the polished rod (7) to drive the dual-hemispherical centralizer (20) to move upwards through the closing unit, the handbrake is tightened to continue to properly unscrew the declination rectification pressure cap (44), the polished rod (7) is shaken several times, then the declination rectification pressure cap (44) is rapidly screwed, and finally the closer pressure cap (13) is opened to open the well, the pumping machine is started, and a screwing degree of a packing box upper pressure cap (1) is preferably in the polished rod (7) without heat and oil.

Although given embodiments have been described, these embodiments are only for illustration and are not intended to limit a protective scope of the present invention. In fact, the embodiment described in the specification may be implemented in various variants, that is, various omissions, substitutions, changes and other variations may be made to the above embodiments based on the spirit of the present invention, and the appended claims include these variations or modifications, so that they will fall into the protective scope of the present invention.

What is claimed is:

1. A connection unit for connecting a wellhead and a packing box of a sucker-rod pumping machine, wherein the connection unit is a flexible connection unit, comprising:
    a lower flexible sealing sleeve that sleeves over a sealing steel ring;
    a lower flexible sealing sleeve housing disposed about an outer circumference of the lower flexible sealing sleeve; and
    an upper flexible sealing sleeve, wherein an outer circumference of the upper flexible sealing sleeve is in contact with an inner surface of a packing outer sleeve of the packing box and a bottom surface of the upper flexible sealing sleeve is transversely disposed on and affixed to the sealing steel ring,
    wherein the upper flexible sealing sleeve and the sealing steel ring are configured to allow a polished rod of the sucker-rod pumping machine to extend through the upper flexible sealing sleeve and the sealing steel ring, and
    wherein the lower flexible sealing sleeve and the upper flexible sealing sleeve are each made of an organic material, and
    wherein the upper flexible sealing sleeve and the lower flexible sealing sleeve enable an angular movement of the flexible connection unit during an operation of the sucker-rod pumping machine.

2. The connection unit according to claim 1, wherein, during the operation of the sucker-rod pumping machine, the flexible connection unit is linked with a packing within the packing outer sleeve and swings together with the polished rod so that the polished rod and the packing maintains dynamic coaxiality so as to reduce wear caused by frictions between the packing and the polished rod.

3. The connection unit according to claim 1, wherein a groove is provided on the outer circumference of the upper flexible sealing sleeve and the upper flexible sealing sleeve is affixed to the packing outer sleeve by receiving a protrusion from the packing outer sleeve in the groove.

4. The connection unit according to claim 1, wherein the lower flexible sealing sleeve comprises a portion having a reduced diameter and the portion having the reduced diameter is affixed to the lower flexible sealing sleeve housing.

5. A wellhead sealing device of a sucker-rod pumping machine, comprising the connection unit according to claim 1 installed between the wellhead and the packing box.

6. The wellhead sealing device of a sucker-rod pumping machine according to claim 5, further comprising a blowout prevention unit, a closing unit, and a declination rectification unit, wherein the polished rod is configured to extend sequentially through the packing box, the connection unit, the closing unit, the declination rectification unit, and the blowout prevention unit.

7. The wellhead sealing device of a sucker-rod pumping machine according to claim 6, wherein the blowout prevention unit comprises a blowout prevention ball having a through hole extending through a center of the blowout prevention ball for receiving the polished rod.

8. The wellhead sealing device of a sucker-rod pumping machine according to claim 7, wherein the blowout prevention ball comprises a first portion having a first weight and a second portion having a second weight, wherein the second weight is heavier than the first weight and the through hole extends through the first portion, and, when the polished rod is not extended through the blowout prevention ball, the first portion rotates upward so that the through hole is not aligned with an axial direction of the polished rod.

9. The wellhead sealing device of a sucker-rod pumping machine according to claim 8, further comprising a supporting spring, a lower supporting ring, and an upper bracket sequentially stacked a cavity of a wellhead clamp joint, wherein the wellhead clamp joint is in a threaded connection with a declination rectification base and fixed by a declination rectification base pin, and the wellhead clamp joint is sealed with the declination rectification base by a wellhead clamp joint sealing gasket.

10. The wellhead sealing device of a sucker-rod pumping machine according to claim 6, wherein the declination rectification unit connects a declination rectification sealing ring, a dual-hemispherical centralizer and a horizontal compression ring by a flexible connecting sleeve.

11. The wellhead sealing device of a sucker-rod pumping machine according to claim 10, wherein the declination rectification unit further comprises a declination rectification base and a declination rectification pressure cap pin.

12. The wellhead sealing device of a sucker-rod pumping machine according to claim 11, wherein the declination rectification sealing ring with a declination rectification sealing ring upper sealing gasket, the dual-hemispherical centralizer, and the horizontal compression ring with a horizontal compression ring upper sealing gasket and a horizontal compression ring lower sealing gasket are sequentially stacked on the declination rectification base, the flexible connecting sleeve is sleeved over the horizontal compression ring and the declination rectification sealing ring, and wherein a declination rectification pressure cap is in a threaded connection with the declination rectification base and fixed by the declination rectification pressure cap pin.

13. The wellhead sealing device of a sucker-rod pumping machine according to claim 6, wherein the closing unit comprises a positioning device comprising one or more semi-conical polished positioning blocks.

14. The wellhead sealing device of a sucker-rod pumping machine according to claim 6, wherein the closing unit comprises a closing packing, two semi-conical polished positioning blocks, and a closing packing compression ring with a closing packing compression ring upper sealing gasket and a closing packing compression ring lower sealing gasket, a non-return oil collection ring and a closing unit base from the bottom up.

15. The wellhead sealing device of a sucker-rod pumping machine according to claim 14, wherein during well closing, the two semi-conical polished positioning blocks forcibly center and lock the polished rod; and during normal operation, the two semi-conical polished positioning blocks are disengaged from the polished rod.

16. The wellhead sealing device of a sucker-rod pumping machine according to claim 7, further comprising a lubrication unit disposed about the packing box and provides a solid lubricant and a liquid lubricant between the polished rod and the packing.

17. The wellhead sealing device of a sucker-rod pumping machine according to claim 16, wherein the lubrication unit comprises a solid lubricator, the solid lubricator is installed between the packing and the top of the wellhead sealing device, and the solid lubricant is pressed against the polished rod by a spring.

18. The wellhead sealing device of a sucker-rod pumping machine according to claim 16, wherein the lubrication unit comprises a non-return oil collection ring.

19. The wellhead sealing device of a sucker-rod pumping machine according to claim 18, wherein the non-return oil collection ring is configured to store crude oil in a cavity in the non-return oil collection ring.

20. The wellhead sealing device of a sucker-rod pumping machine according to claim 7, wherein, during operation, the packing in the packing box moves together with the polished rod so as to achieve dynamic coaxiality between the packing and the polished rod.

21. The wellhead sealing device of a sucker-rod pumping machine according to claim 20, wherein the packing is placed in the packing outer sleeve, a packing compression ring is inserted in the packing outer sleeve, wherein a lower knuckle bearing, an upper knuckle bearing, a pressure bearing, and a packing box pressure cap are sequentially sleeved on the packing compression ring, wherein the packing box pressure cap is in a threaded connection with a closer pressure cap, and wherein there is no contact between the packing outer sleeve and the packing box pressure cap and there is a lateral movement space therebetween.

* * * * *